(12) United States Patent
Sakamoto et al.

(10) Patent No.: US 8,679,397 B2
(45) Date of Patent: Mar. 25, 2014

(54) METHOD OF MANUFACTURING HOLLOW BODY

(75) Inventors: Tomoyoshi Sakamoto, Ota (JP); Minoru Ojiro, Gunma (JP); Hiroki Katagiri, Gunma (JP)

(73) Assignee: RP Topla Limited, Suita-Shi (JP)

(*) Notice: Subject to any disclaimer, the term of this patent is extended or adjusted under 35 U.S.C. 154(b) by 127 days.

(21) Appl. No.: 13/258,542

(22) PCT Filed: Jan. 21, 2010

(86) PCT No.: PCT/JP2010/000330
§ 371 (c)(1),
(2), (4) Date: Nov. 23, 2011

(87) PCT Pub. No.: WO2010/116580
PCT Pub. Date: Oct. 14, 2010

(65) Prior Publication Data
US 2012/0068388 A1 Mar. 22, 2012

(30) Foreign Application Priority Data
Apr. 10, 2009 (JP) ................................. 2009-095413

(51) Int. Cl.
*B29C 45/00* (2006.01)

(52) U.S. Cl.
USPC .......................................... 264/544; 264/573

(58) Field of Classification Search
None
See application file for complete search history.

(56) References Cited

U.S. PATENT DOCUMENTS 5,948,343 A * 9/1999 Hiroki et al. ................... 264/503
2001/0016240 A1 8/2001 Iizuka et al.

FOREIGN PATENT DOCUMENTS

JP 8-229993 A 9/1996
JP 2001-253950 A 9/2001

OTHER PUBLICATIONS

International Search Report for PCT/JP2010/000330 dated Feb. 16, 2010.
"Möglichkeiten und Grenzen der Projektilinjektionstechnik," IKV Fachtagung Gas- und Wasserinjektionstechnik—Potenziale nutzen, Herausforderungen meistern, XP007905530, Nov. 28, 2007, pp. 1-7.
Bothur Christian, "Spritzgießtechnik: Technologische Möglichkeiten nehmen permanent zu," Industrieanzeiger, XP002680888, Oct. 14, 2007, pp. 1-3.
Supplementary European Search Report for European Patent Application No. 10761288.9, dated Aug. 9, 2012.

* cited by examiner

*Primary Examiner* — Monica Huson
(74) *Attorney, Agent, or Firm* — Birch, Stewart, Kolasch & Birch, LLP

(57) ABSTRACT

A hollow body formed of a thermoplastic resin and having uniform inner diameter and thickness and an excellent inner surface smoothness, and, in particular, a pipe-shaped hollow body having a bent portion is manufactured by injection molding.

A method of manufacturing a hollow body includes injecting a molten resin 8 into a mold cavity 2 of a mold 1, the mold cavity 2 having on its one end a pressure port 4 provided with a floating core 6 and on its other end an outlet 5, pressure-injecting a pressurized fluid through the pressure port 4 after the injection of the molten resin 8, and moving the floating core 6 toward the outlet 5, and, at the same time, extruding the molten resin 8 from the outlet 5.

In the method, the floating core 6 is constituted of a columnar portion and a top portion, which is continuously connected to one surface of the columnar portion and has a shape that a cross-sectional area perpendicular to a central axis of the columnar portion gradually decreases from one surface side of the columnar portion. When a diameter of the columnar portion is represented by A, the height of the columnar portion is 0.1 A to 1 A, and the height of the top portion is 0.3 A to 1.6 A.

6 Claims, 12 Drawing Sheets

Fig.6
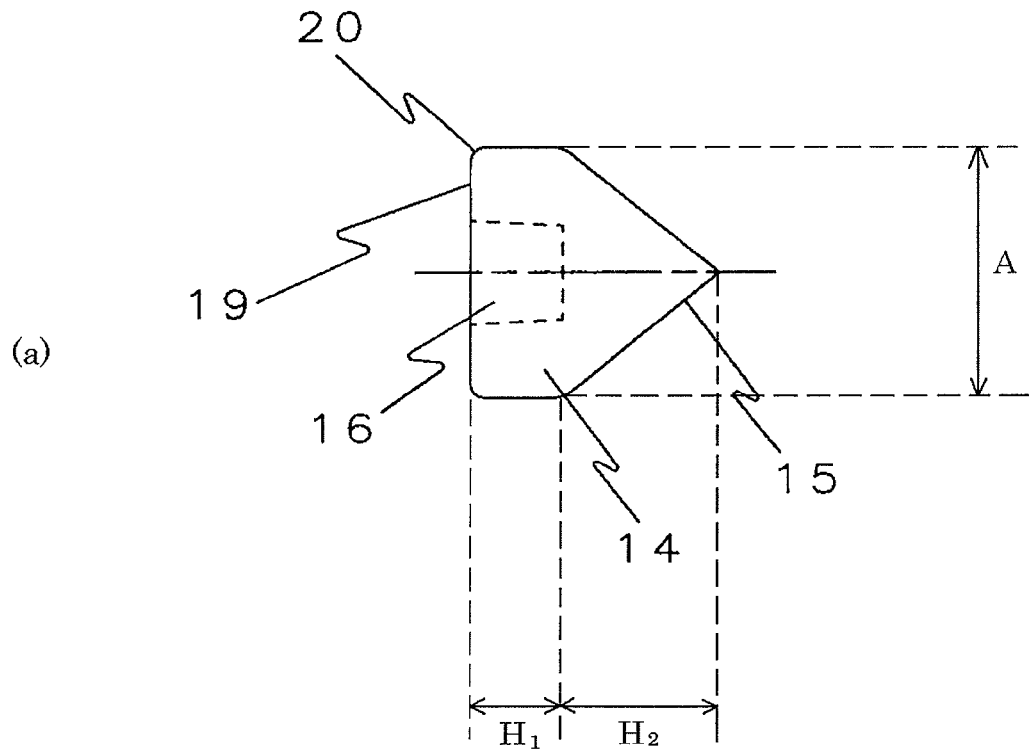
(a)
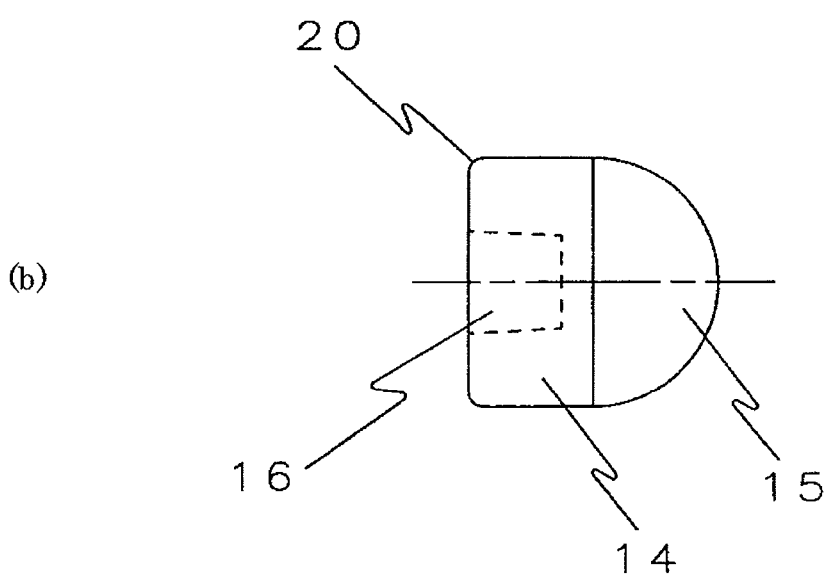
(b)

METHOD OF MANUFACTURING HOLLOW BODY

TECHNICAL FIELD

The present invention relates to a method of manufacturing a hollow body, and particularly relates to a method of manufacturing a hollow body suitable for the manufacturing of bent pipes formed of a thermoplastic resin.

BACKGROUND ART

As a method of molding a pipe formed of a thermosetting resin, extrusion molding and blow molding have been used conventionally.

Although a pipe formed by the extrusion molding is essentially a straight pipe, the pipe is formed of a soft material, or the pipe has a corrugated design, for example, whereby the pipe can obtain flexibility. However, in the extrusion molding method, a pipe material itself is rigid, and thus a bent pipe having smooth inner and outer surfaces cannot be obtained. Moreover, a flange portion and an attachment portion cannot be integrally molded to a pipe, and a molded body portion having a coupling function cannot be integrally molded to a pipe end portion.

In the blow molding method, although a three-dimensional bent pipe can be molded by the recent development of a mold tilting mechanism and a multipurpose blow molding machine having a mold swinging apparatus, the thickness accuracy, the surface finishing accuracy, the dimensional accuracy, component integrating function, and so on do not attain a satisfactory level compared to injection molding. Further, the blow molding method has many problems that the material to be used is limited in terms of characteristics such as the fluidity and the melt viscoelasticity of the materials, and especially engineering plastics are strongly subjected to the above limitations.

As a method of forming a hollow body by injection molding, there has been known a gas assist injection molding method (Patent Documents 1 and 2). However, although a hollow pipe portion can be molded by this method, a uniform inner diameter cannot be secured. Although there has been known a water assist injection molding (WIT) method of forming the hollow pipe portion with the use of water as a fluid instead of gas (Non Patent Document 1), this method has a problem in the uniformity of a pipe inner diameter, the uniformity of pipe thickness, the smoothness of a pipe inner surface, and so on, and thus there is a limit to the expansion of pipe molding by the injection molding.

As a molding method that solves the above problems, a method using a floating core has been known (Patent Documents 3 and 4). According to the method described in the Patent Documents 3 and 4, the uniformity of the inner diameter and the thickness of a pipe to be manufactured is far excellent compared to the method described in the Patent Documents 1 and 2. However, in order to apply the method to a pipe required to have high strength and high durability, a higher level of uniformity in the pipe inner diameter and the pipe thickness and the smoothness of the pipe inner surface are required, and it is a fact that there is a limit to the increasing use of this method.

PRIOR ART DOCUMENTS

Patent Documents

Patent Document 1: Japanese Patent Application Publication No. 57-14968

Patent Document 2: Japanese Patent Application Laid-Open No. 63-268611

Patent Document 3: Japanese Patent No. 1988870

Patent Document 4: Japanese Patent No. 3411710

Non Patent Document

Non Patent Document 1: Plastic Age Encyclopedia, 2007, September issue, p. 106

DISCLOSURE OF THE INVENTION

Problems to be Solved by the Invention

Objects of the present invention are to solve the above problems and to manufacture, by injection molding, a hollow body formed of a thermoplastic resin and having uniform inner diameter and thickness and an excellent inner surface smoothness, and, in particular, a pipe-shaped hollow body having a bent portion.

Means for Solving the Problems

In a method of manufacturing a hollow body, which comprises injecting a molten resin into a mold cavity of a mold, the mold cavity having on its one end a pressure port provided with a floating core and on its other end an outlet, pressure-injecting a pressurized fluid through the pressure port after the injection of the molten resin, and moving the floating core to the outlet side, and, at the same time, extruding the molten resin from the outlet, the method is characterized in that the floating core is constituted of a columnar portion and a top portion, which is continuously connected to one surface of the columnar portion and has a shape that a cross-sectional area perpendicular to a central axis of the columnar portion gradually decreases from one surface side of the columnar portion, and when a diameter of the columnar portion is represented by A, the height of the columnar portion is 0.1 A to 1 A, and the height of the top portion is 0.3 A to 1.6 A.

Effect of the Invention

According to the present invention, it is possible to manufacture, by injection molding, a hollow body formed of a thermoplastic resin and having uniform inner diameter and thickness and an excellent inner surface smoothness, and, in particular, a pipe-shaped hollow body having a bent portion. Further, since the hollow body is formed by the injection molding, various attached complex portions including an attachment portion, a connection portion, and a seal portion can be integrally molded with the hollow body such as a bent pipe, so that cost can be reduced.

BRIEF DESCRIPTION OF THE DRAWINGS

[FIG. 6] A longitudinal cross-sectional view showing an example of a floating core used in the present invention.

MODE FOR CARRYING OUT THE INVENTION

Hereinafter, the present invention will be described in detail.

Figure 1:
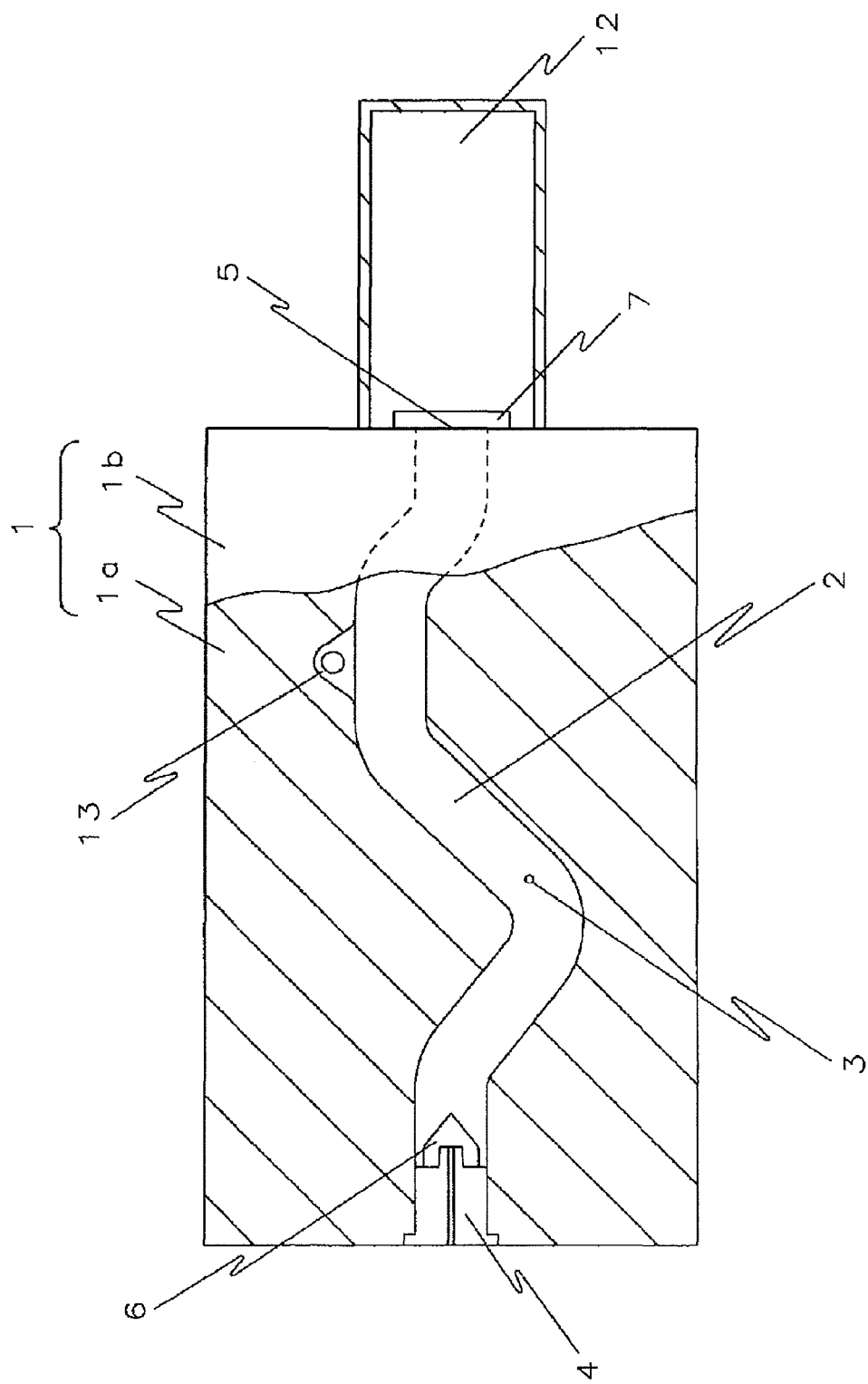
[FIG. 1] A view showing an example of a mold used in the present invention.
Figure 5:
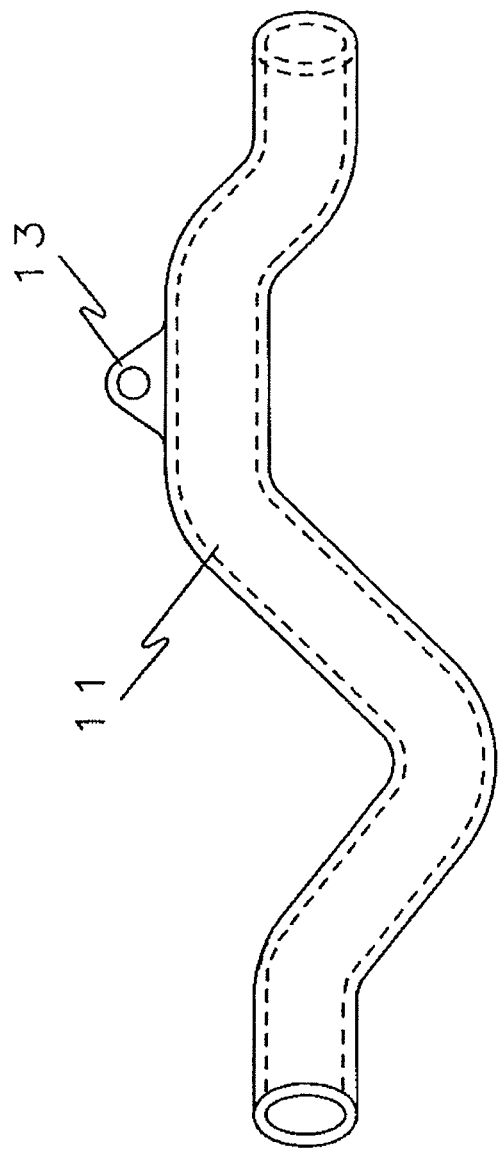
[FIG. 5] A perspective view showing an example of a hollow body obtained in the invention.

FIG. 1 is a partially cut-out view showing an example of a mold for use in the molding of a bent pipe having curved tube portions and straight tube portions shown in FIG. 5. In FIG. 1, a mold 1 is constituted of a first mold 1a and a second mold 1b. The respective mating surfaces of the first and second molds 1a and 1b each have a mold cavity 2 matching the shape of a pipe. The first mold 1a has an injection port 3 formed therein. The mold cavity 2 has on its one end a pressure port 4 communicating with outside and on its other end an outlet 5 communicating with outside. A floating core 6 having a cross-sectional diameter smaller than the inner diameter of the mold cavity 2 is fitted in the pressure port 4 in a movable manner. The outlet 5 has opening and closing means 7. The outlet 5 is provided with an excess resin storage cavity 12 communicating with the outlet 5 and being capable of storing an excess resin and the floating core 6.

Figure 3:
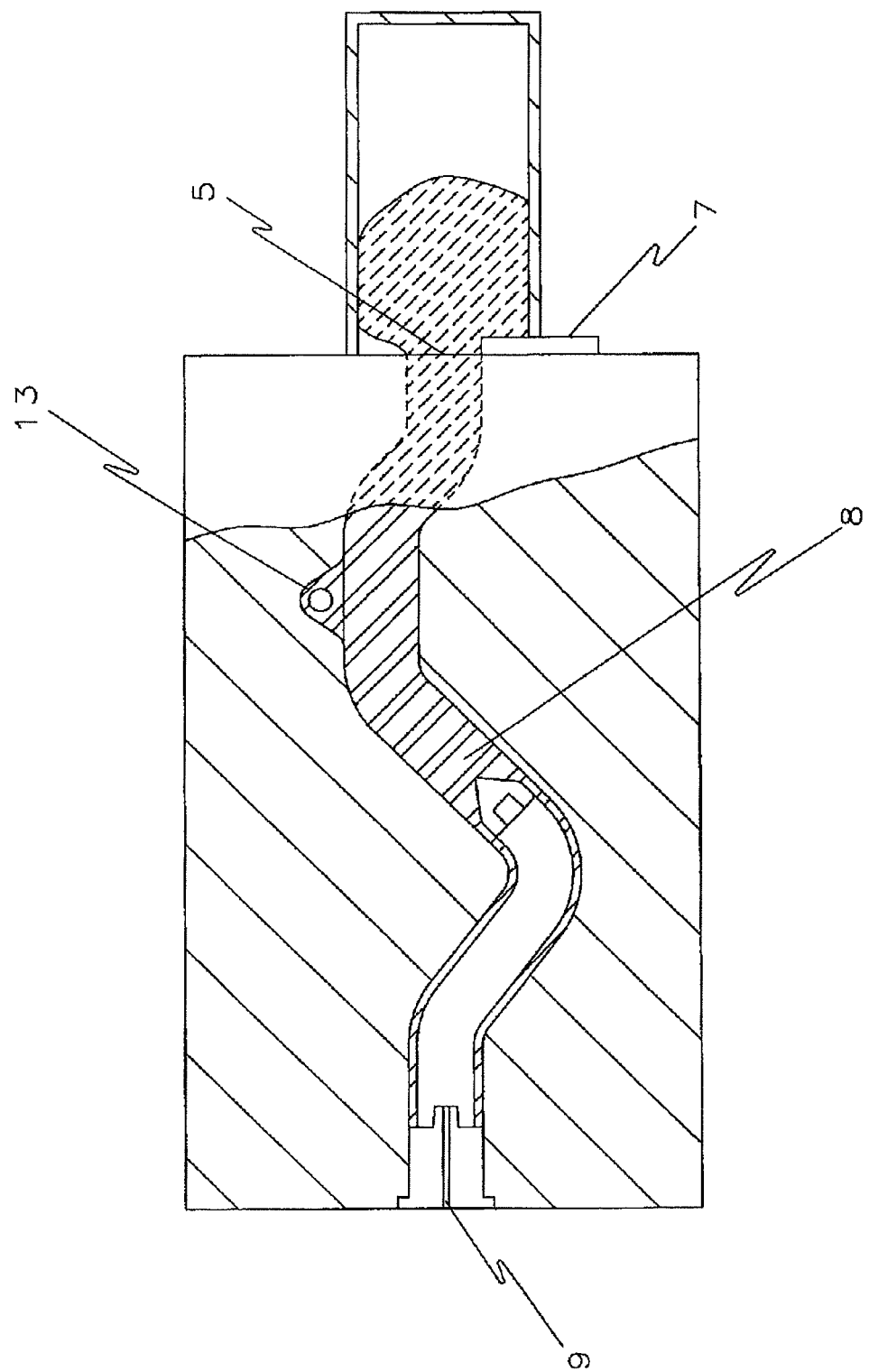
[FIG. 3] An explanatory view of a molding method according to the present invention.
Figure 4:
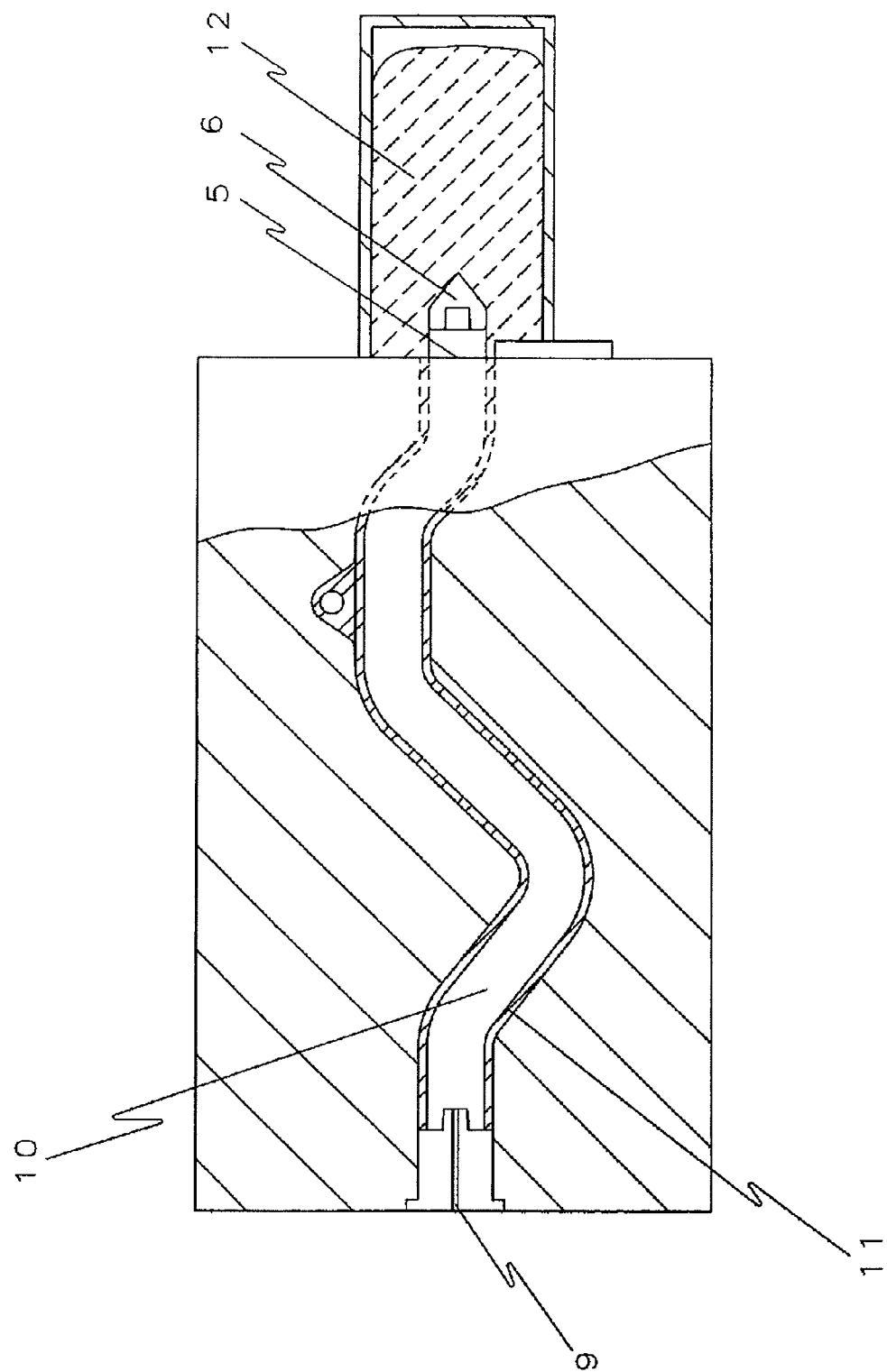
[FIG. 4] An explanatory view of a molding method according to the present invention.

Next, a method of manufacturing the bent pipe shown in FIG. 5 with the use of the mold shown in FIG. 1 will be described with reference to FIGS. 2 to 4.

Figure 2:
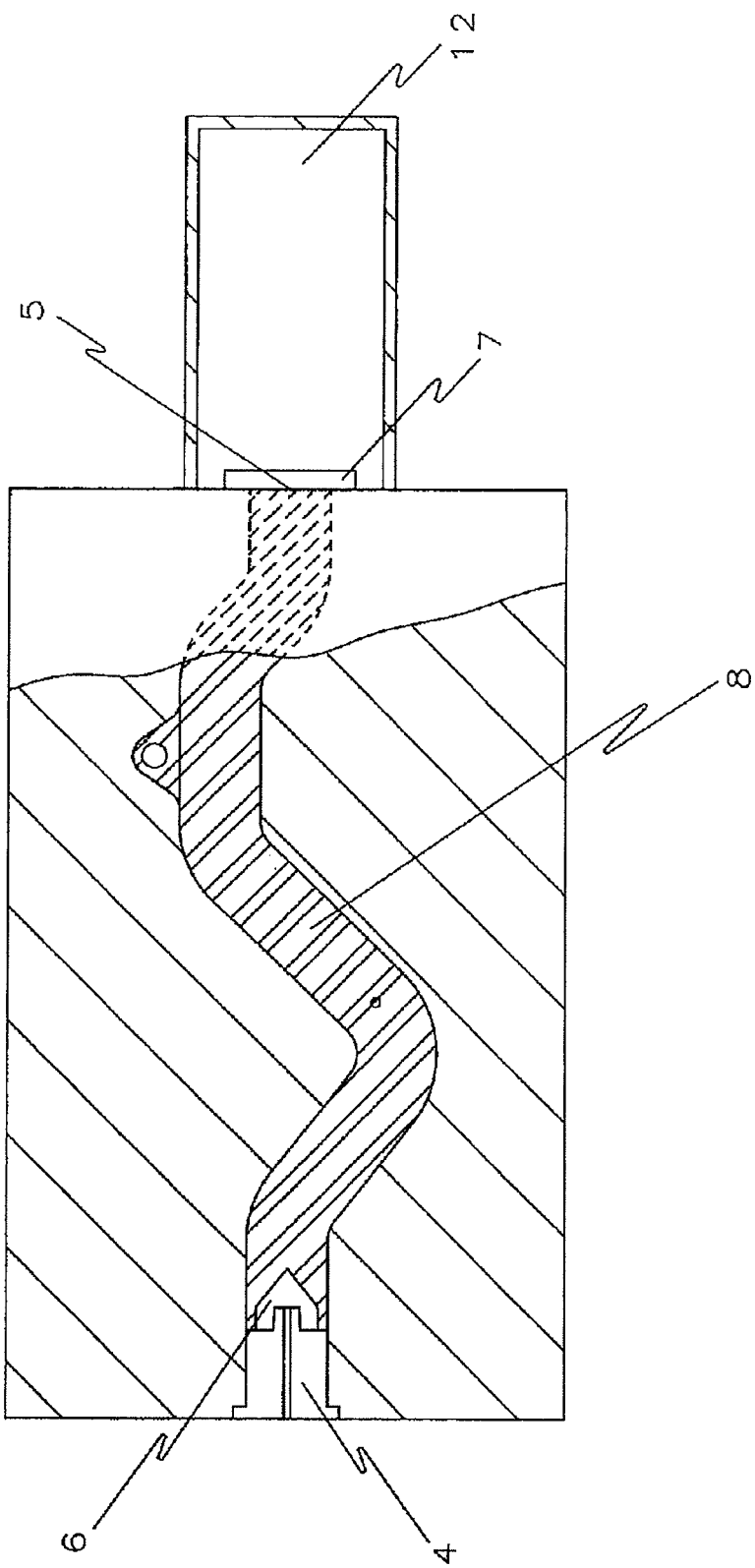
[FIG. 2] An explanatory view of a molding method according to the present invention.

First, a molten resin 8 is injected from the injection port 3 of the first mold 1a, and, as shown in FIG. 2, the mold cavity 2 is filled with the molten resin 8.

After the filling of the molten resin 8, the opening and closing means 7 is opened. Then, a pressurized fluid is pressure-injected into a pressurized fluid port 9 of the pressure port 4 through a pressurized fluid source (not shown), and the floating core 6 is pressed into the molten resin 8. As shown in FIG. 3, the floating core 6 moves toward the outlet 5 so as to follow the center portion of a resin which is still in a molten state, that is, a portion having a relatively low viscosity. The pressurized fluid is continuously pressure-injected, and, as shown in FIG. 4, the floating core 6 is discharged from the outlet 5 to be stored in the excess resin storage cavity 12.

At that time, while the floating core 6 presses the molten resin 8, existing ahead of the floating core 6, against the inner surface of the mold cavity 2, the floating core 6 extrudes the excess molten resin 8 into the excess resin storage cavity 12 through the outlet 5. Accordingly, after the floating core 6 passes through the center portion, a resin with uniform thickness remains on the inner surface of the mold cavity 2, and a hollow portion 10 having an inner diameter substantially equal to the cross-sectional diameter of the floating core 6 and a pipe portion 11 are formed. The floating core 6 moves along the mold cavity 2 thus, and therefore, even when the hollow portion 10 has a complex multidimensional shape, the good hollow portion 10 is formed. Further, since the molten resin 8 is pressed against the mold cavity 2 by the application of a pressure from the hollow portion 10, the surface condition of the completed bent pipe is clean, and thus there is no shrinkage and warpage.

After the molten resin 8 is solidified by cooling, the pressurized fluid is discharged outside through the pressure port or by a suitable method or collected, and then the mold 1 is opened to remove the bent pipe.

The excess resin extruded by the floating core 6 is stored in the excess resin storage cavity 12, and thereafter, when a sprue, a runner, and the floating core 6 are formed of the same resin material, the excess resin can be reutilized as a material of products along with the floating core 6, and thus there is no material loss. The cross-sectional diameter of the floating core 6 is changed to the inner diameter of the mold cavity 2, whereby a bent pipe product having a desired thickness can be obtained. The bent pipe portion 11 which could not be obtained by the blow molding and extrusion molding, a bracket and a rib moldable by general injection molding, and protrusions such as the attachment portion 13 can be simultaneously integrally molded.

FIG. 6 shows a longitudinal cross-sectional view of an example of a floating core used in the present invention. The floating core of the present invention is constituted of a columnar portion 14 and a top portion 15, which is continuously connected to one surface of the columnar portion 14 and has a shape that the cross-sectional area perpendicular to the central axis of the columnar portion 14 gradually decreases from one surface side of the columnar portion 14 to the front end side (a conical shape in FIG. 6(a), and a hemispherical shape in FIG. 6(b)). In the floating core shown in FIG. 6, the area of one surface of the columnar portion 14 is equal to the area of the surface on which the top portion 15 is in contact with the columnar portion 14, and the central axis of the columnar portion 14 is equal to the central axis of the top portion 15.

When the floating core is a sphere, seam flaws occur on the inner surface of a hollow portion of a hollow body to be obtained, and the smoothness of the inner surface is reduced. Especially when the hollow body has a bent portion, such a phenomenon notably occurs around the bent portion. When the floating core is merely a conical body or a hemispherical body, for example, and has a shape with no columnar portion, the floating core does not move at the intermediate portion of the mold cavity, and a desired hollow body cannot be obtained.

Figure 7:
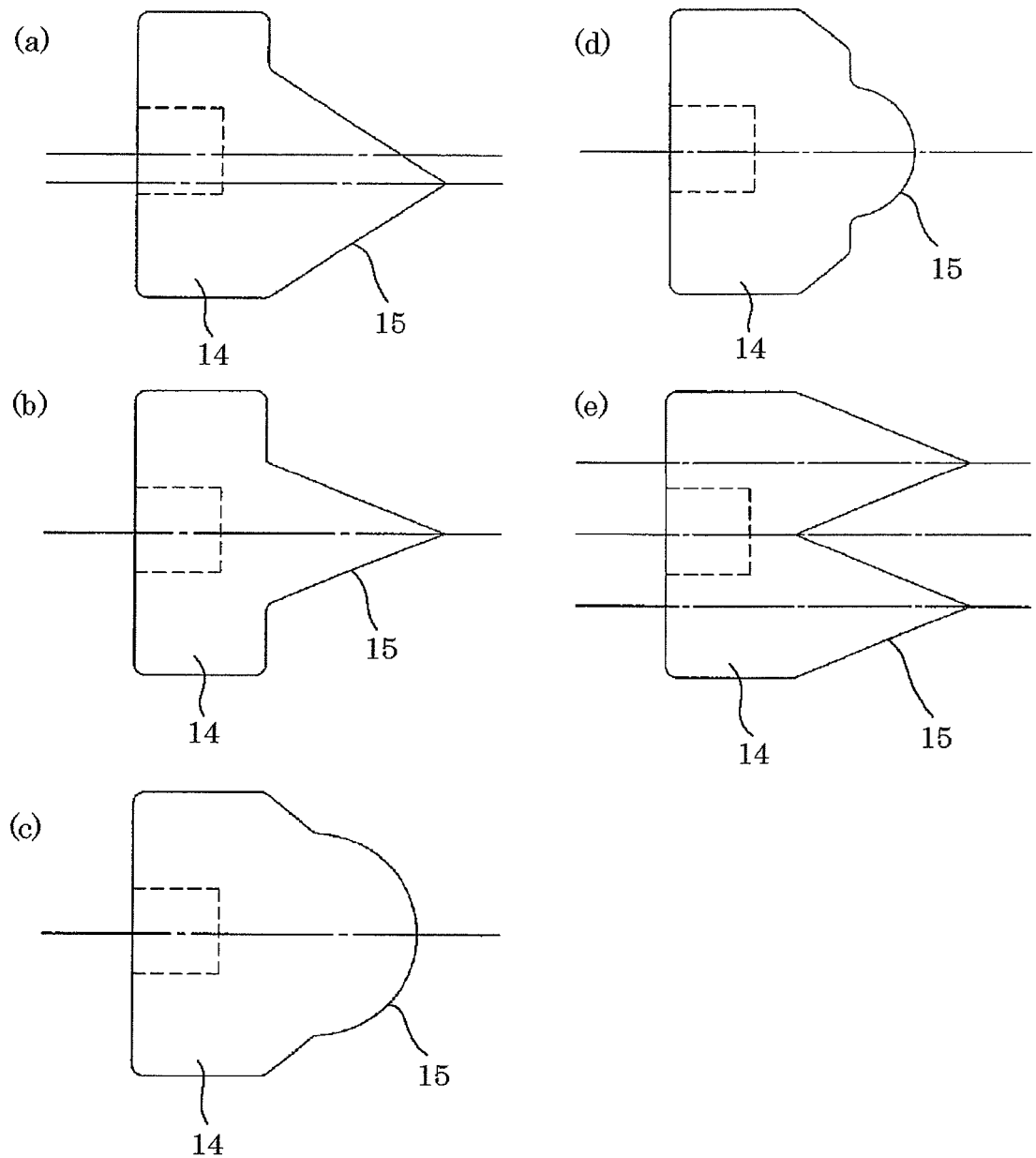
[FIG. 7] A longitudinal cross-sectional view showing another example of the floating core used in the present invention.

The floating core used in the present invention is not limited to the floating core shown in FIG. 6. For example, as shown in FIG. 7(a), the central axis of the columnar portion 14 and the central axis of the top portion 15 may be different from each other, and, as shown in FIG. 7(b), the area of the surface on which the top portion 15 is in contact with the columnar portion 14 may be smaller than the area of one surface of the columnar portion 14. Further, as the top portion 15, a circular cone and a hemisphere may be superposed as shown in FIGS. 7(c) (d), or a plurality of circular cones may be arranged in a row as shown in FIG. 7(e). The hemispheres of FIGS. 6 and 7 may be half-turned ellipsoidal bodies.

In the floating core used in the present invention, as shown in FIG. 6(a), when the diameter of the columnar portion 14 is represented by A, the height $H_1$ of the columnar portion 14 is 0.1 A to 1 A, preferably 0.3 A to 0.9 A, and the height $H_2$ of the top portion 15 is 0.3 A to 1.6 A, preferably 0.3 A to 1.2 A. The height $H_2$ of the top portion 15 is the height of the highest portion in the floating core shown in FIG. 7(e).

When the height $H_1$ of the columnar portion 14 is less than 0.1 A, the floating core only moves to an intermediate portion of the mold cavity. Meanwhile, when the height $H_1$ of the columnar portion 14 is more than 1 A, seam flaws are formed on the inner surface of the hollow portion of the hollow body to be obtained, and, in particular, the bent portion, so that a product having inferior inner surface smoothness is obtained. Meanwhile, when the height $H_2$ of the top portion 15 is out of the above range, the floating core only moves to an intermediate portion of the mold cavity, or even when the floating core moves to the end of the mold cavity, only a product having inferior inner surface smoothness is obtained.

It is preferable that the floating core used in the present invention has, as shown in FIG. 6, a corner rounding portion 20 provided at the peripheral edge of the other surface (a bottom surface 19) of the columnar portion 14 and subjected to a corner rounding processing with a curvature radius of A/1000 to A/3, preferably A/100 to A/3. When the curvature radius is not less than A/1000, seam flaws are less likely to occur on the inner surface of the hollow portion of the hollow body, and, in particular, the bent portion. When the curvature radius is not more than A/3, the movement of the floating core in the mold cavity is propelled.

Figure 8:
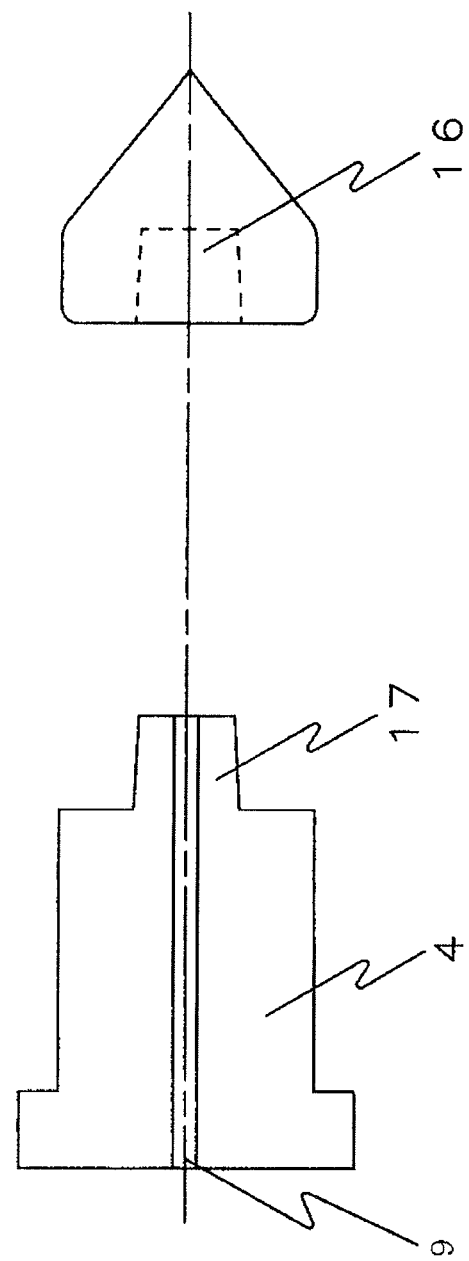
[FIG. 8] A longitudinal cross-sectional view showing an example of a pressure port and a floating core used in the present invention.
Figure 9:
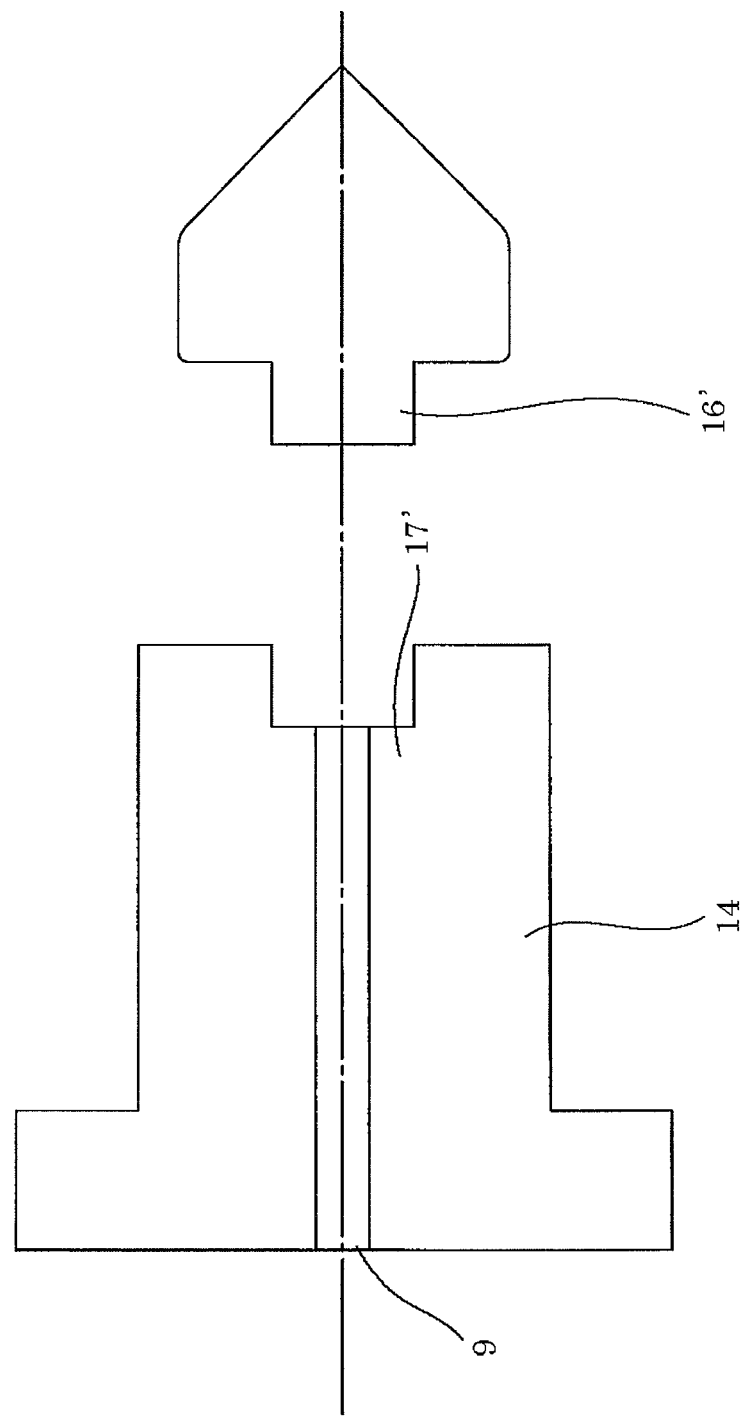
[FIG. 9] A longitudinal cross-sectional view showing another example of the pressure port and the floating core used in the present invention.

It is preferable that the floating core used in the present invention has, as shown in FIG. 6, a recess 16 which is provided in the other surface (the bottom surface 19) of the columnar portion 14 and can be fitted in the pressure port. As shown in FIG. 1, by virtue of the fitting of the floating core 6 in the pressure port 4, when the molten resin is injected, the floating core can be prevented from deviating from the center of the hollow portion of the hollow body to be obtained, and the hollow body having a more uniformed thickness can be obtained. FIG. 8 shows an enlarged view of the pressure port and the floating core. As shown in FIG. 8, it is preferable that a protrusion 17 of the pressure port 4 has a taper, and it is preferable that the recess 16 of the floating core also has a taper having the substantially same angle as the taper of the protrusion 17 so that the protrusion 17 is firmly fitted in the recess 16. As shown in FIG. 9, the floating core has a protrusion 16' on the bottom surface, whereby when the protrusion 16' is fitted in a recess 17' of the pressure port 4, a similar effect can be obtained.

The floating core may be formed of a suitable material such as a resin, a metal, and ceramics as long as the material is a hard material that can endure a molten resin pressure and a temperature. When the floating core is formed of a resin the same as a raw material resin of a hollow body, the floating core can be recycled simultaneously with recycling of an excess resin. It is preferable that a floating core molding cavity is provided at arbitrary positions of a mold, whereby the floating core can be molded simultaneously with the molding of the hollow body.

However, since the fluid is pressure-injected under high temperature and high pressure environments, an inert gas such as nitrogen gas is preferably used as the fluid.

The resin as the raw material of the hollow body is not limited especially as long as it is a general-purpose injection-moldable resin, and the resin includes a general-purpose resin such as a polyethylene resin, a polypropylene resin, a polystyrene resin, an ABS resin, an AS resin, a PMMA resin, and a PVC resin and an engineering resin such as a polycarbonate resin, a polyamide resin, a polyacetal resin, a modified PPE resin, a PPS resin, and an LCP resin. The above resins may be mixed with, for example, a reinforcement such as glass fiber and talc and an additive such as a colorant and a stabilizer depending on the application of the hollow body.

Since the hollow body obtained by the present invention, and, in particular, the pipe-shaped hollow body having the bent portion has uniform thickness, the hollow body has excellent strength and durability, uniform inner diameter, and excellent inner surface smoothness; therefore, the fluid flows smoothly, and the flow rate is uniform. Accordingly, the hollow body is optimum for various pipes used in a vehicle engine cooling system and a vehicle temperature regulation system.

EXAMPLES

The invention will be described in more detail by embodiments.

Example 1

A bent pipe shown in FIG. 5 in which an attachment portion 13 is integrally formed with a pipe portion 11 (outer diameter is 21 mm, the inner diameter is 16 mm, the thickness is 2.5 mm, and the length is 250 mm) is molded using the mold of FIG. 1.

Figure 10:
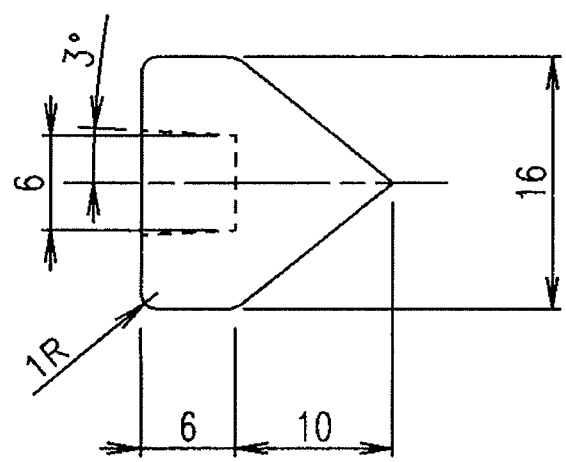
[FIG. 10] A longitudinal cross-sectional view showing a floating core used in an embodiment 1.

As a floating core, the one shown in FIG. 10 is used. The floating core of FIG. 10 is formed of a GF reinforced polyamide 66 resin ("Leona 14G33" manufactured by Asahi Kasei Chemicals Corporation). The diameter (A) of a columnar portion of the floating core is 16 mm, the height ($H_1$) of the columnar portion is 6 mm, and the height ($H_2$) of a conically-shaped top portion of the floating core is 10 mm. The bottom surface of the columnar portion has a recess (the diameter is 6 mm, the depth is 6 mm, and the taper is 3°), and a corner rounding processing with a curvature radius of 1 mm is applied to the peripheral edge of the bottom surface of the columnar portion.

The GF reinforced polyamide 66 is injected at a resin temperature of 260° C. and an injection pressure of 11.77 MPa (120 Kg/cm$^2$), using an injection molder (TP-180H manufactured by Toyo Machinery & Metal Co., Ltd.), and, as shown in FIG. 2, the mold cavity 2 is filled with the molten resin.

After a lapse of 1 second from the completion of injection, the opening and closing means 7 is opened, and nitrogen gas with a pressure of 22.56 MPa (230 kg/cm$^2$) is pressure-injected through the pressurized fluid port 9 of the pressure port 4 connected to a gas generator for gas hollow molding ("air mold" manufactured by Asahi Engineering. Co., Ltd.). Then, the floating core 6 is moved as shown in FIG. 3. As shown in FIG. 4, after the floating core 6 is stored in the excess resin storage cavity 12, the resin is cooled for 30 seconds, and the bent pipe is removed.

A difference between the maximum value and the minimum value of the thickness of the pipe portion 11 is 1 mm. The inner surface of the pipe portion 11 has no defects such as flaws and is smooth. When hot water of 80° C. is flowed through the bent pipe for 1000 hours while being subjected to the inner pressure of 147.10 kPa (1.5 Kg/cm$^2$), the bent pipe is highly durable without causing the increase of the resistance to flow, the occurrence of cracks, and so on.

Examples 2 to 6 and Comparative Examples 2 and 3

A bent pipe is obtained in the same manner as for the embodiment 1 except that the shape of the floating core is changed to the shape shown in a table 1. The results are shown in the table 1.

Example 7

Figure 11:
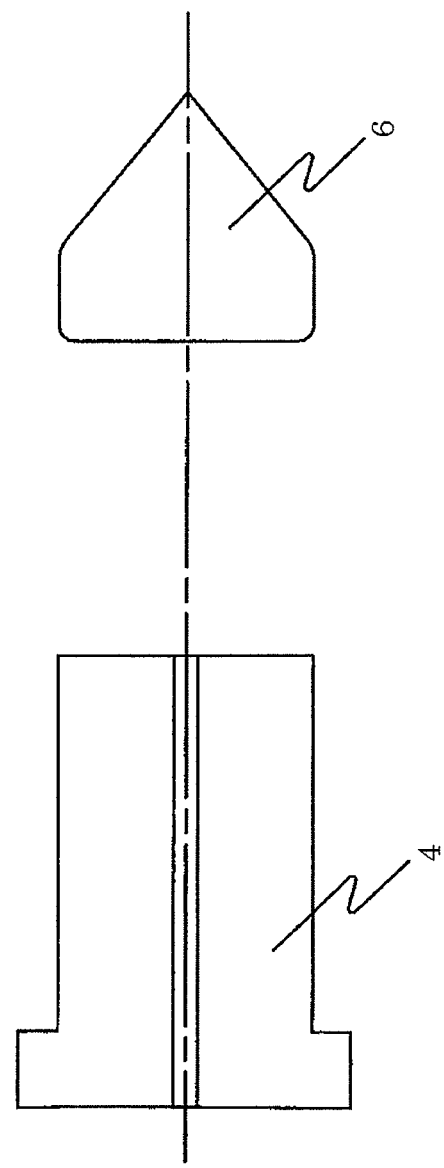
[FIG. 11] A longitudinal cross-sectional view showing a pressure port and a floating core used in an embodiment 7.

A bent pipe is obtained in the same manner as for the embodiment 1 except for using the floating core, which is the same as the floating core of the embodiment 1 except that there is no recess, and the pressure port 4 in plane contact with the floating core 6, as shown in FIG. 11. The results are shown in the table 1.

Example 8

A bent pipe is obtained in the same manner as for the embodiment 1 except for using a modified PPE resin ("Xyron G702H" manufactured by Asahi Kasei Chemicals Corporation) as a thermoplastic resin material of a bent pipe and a floating core. The results are shown in the table 1.

Comparative Example 1

Figure 12:
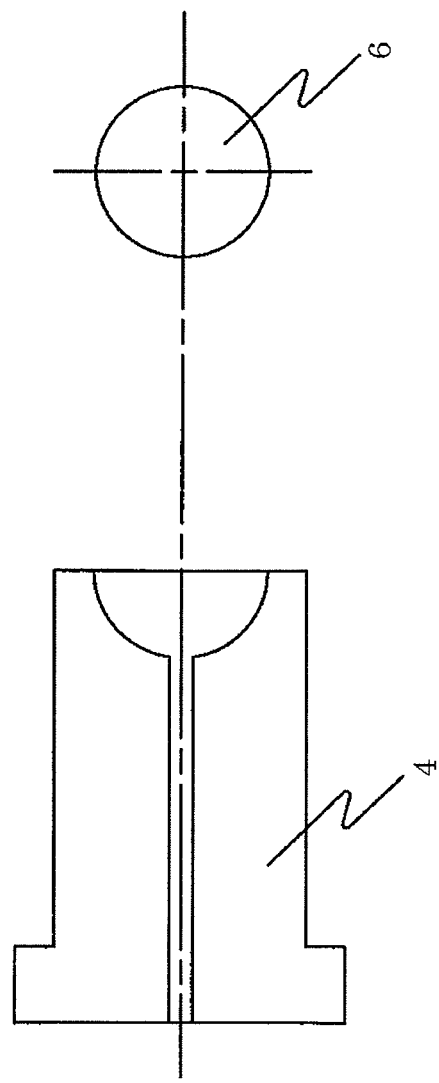
[FIG. 12] A longitudinal cross-sectional view showing a pressure port and a floating core used in a comparative example 1.

A bent pipe is obtained in the same manner as for the embodiment 1 except for using a spherical floating core 6 (the diameter is 16 mm) and a pressure port 4 having a hemispherical recess capable of being fitted with the floating core 6, as shown in FIG. 12. The results are shown in the table 1.

TABLE 1

| | Shape of floating core | | | | Pipe inner surface condition | Pipe thickness Difference between maximum value and minimum value |
|---|---|---|---|---|---|---|
| | A | $H_1$ | $H_2$ | Curvature radius | Recess | | |

| | A | $H_1$ | $H_2$ | Curvature radius | Recess | Pipe inner surface condition | Difference between maximum value and minimum value |
|---|---|---|---|---|---|---|---|
| Example 1 | 16 mm | 6 mm | 10 mm | 1 mm | with | good | 1 mm |
| Example 2 | 15 mm | 8 mm | 7 mm | 2 mm | with | good | 1.2 mm |
| Example 3 | 16 mm | 3 mm | 12 mm | 0.2 mm | with | good | 1.5 mm |
| Example 4 | 12 mm | 7 mm | 5 mm | 0.05 mm | with | good | 1.8 mm |
| Example 5 | 16 mm | 6 mm | 10 mm | — | with | small flaw | 1.2 mm |
| Example 6 | 16 mm | 6 mm | 10 mm | 6 mm | with | small flaw | 1.8 mm |
| Example 7 | 16 mm | 6 mm | 10 mm | 1 mm | without | good | 2.1 mm |
| Example 8 | 16 mm | 6 mm | 10 mm | 1 mm | with | good | 0.8 mm |
| Comparative example 1 | Spherical shape (diameter is 16 mm) | | | | without | with flaw | 2.3 mm |
| Comparative example 2 | 16 mm | 1 mm | 14 mm | 1 mm | with | stop at intermediate portion of floating core; disapproval of pipe molding | |
| Comparative example 3 | 16 mm | 15 mm | 2 mm | 1 mm | with | stop at intermediate portion of floating core; disapproval of pipe molding | |

DESCRIPTION OF THE REFERENCE NUMERALS

1 Mold
2 Mold cavity
3 Injection port
4 Pressure port
5 Outlet
6 Floating core
7 Opening and closing means
8 Molten resin
9 Pressurized fluid port
10 Hollow portion
11 Pipe portion
12 Excess resin storage cavity
13 Attachment portion
14 Columnar portion
15 Top portion
16 Recess
16' Protrusion
17 Protrusion
17' Recess
19 Bottom surface
20 Corner rounding portion

The invention claimed is:

1. A method of manufacturing a pipe-shaped hollow body having a bent portion, which comprises injecting a molten resin into a mold cavity of a mold, the mold cavity having on its one end a pressure port provided with a floating core and on its other end an outlet, pressure-injecting a pressurized fluid through the pressure port after the injection of the molten resin, and moving the floating core to the outlet side, and, at the same time, extruding the molten resin from the outlet, the method comprising:

the floating core is constituted of a columnar portion and a top portion, which is continuously connected to one surface of the columnar portion and has a shape that a cross-sectional area perpendicular to a central axis of the columnar portion gradually decreases from one surface side of the columnar portion, and when a diameter of the columnar portion is represented by A, the height of the columnar portion is 0.1 A to 1 A, and the height of the top portion is 0.3 A to 1.6 A, wherein the floating core is fitted in the pressure port on the other surface side of the columnar portion, and a peripheral edge of the other surface of the columnar portion of the floating core is subjected to a corner rounding processing with a curvature radius of A/1000 to A/3.

2. The method of manufacturing a hollow body according to claim 1, wherein the floating core is fitted with a protrusion of the pressure port by a recess provided in the other surface of the columnar portion.

3. The method of manufacturing a hollow body according to claim 1, wherein an area of one surface of the columnar portion is equal to an area of a surface on which the top portion is in contact with the columnar portion.

4. The method of manufacturing a hollow body according to claim 1, wherein the central axis of the columnar portion is equal to the central axis of the top portion.

5. The method of manufacturing a hollow body according to claim 1, wherein a shape of the top portion is a circular cone or a half-turned ellipsoidal body.

6. The method of manufacturing a hollow body according to claim 5, wherein the half-turned ellipsoidal body is a hemisphere.

* * * * *